US012807115B2

(12) United States Patent
Lee

(10) Patent No.: US 12,807,115 B2
(45) Date of Patent: Nov. 24, 2026

(54) ACTUATOR AND BRAKE SYSTEM INCLUDING THE SAME

(71) Applicant: HL MANDO CORPORATION, Gyeonggi-do (KR)

(72) Inventor: Seyeon Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 495 days.

(21) Appl. No.: 18/375,903

(22) Filed: Oct. 2, 2023

(65) Prior Publication Data

US 2024/0109527 A1 Apr. 4, 2024

(30) Foreign Application Priority Data

Oct. 4, 2022 (KR) ........................ 10-2022-0126326

(51) Int. Cl.

*B60T 13/74* (2006.01)
*F16H 1/16* (2006.01)
*F16H 57/04* (2010.01)

(52) U.S. Cl.

CPC .............. *B60T 13/746* (2013.01); *F16H 1/16* (2013.01); *F16H 57/045* (2013.01); *F16H 57/0464* (2013.01)

(58) Field of Classification Search

None

See application file for complete search history.

(56) References Cited

FOREIGN PATENT DOCUMENTS

| | | | | |
|---|---|---|---|---|
| JP | 2005331075 A * | 12/2005 | | F16H 57/0498 |
| JP | 2009-47266 | 3/2009 | | |
| JP | 2018-203221 | 12/2018 | | |
| JP | 7117161 B2 * | 8/2022 | | |
| KR | 10-2014-0104518 | 8/2014 | | |
| KR | 10-1836128 | 3/2018 | | |
| KR | 10-1838597 | 3/2018 | | |

OTHER PUBLICATIONS

JP-2005331075-A: English Machine Translation (Year: 2005).*
JP-7117161-B2: English Machine Translation (Year: 2022).*
Office Action dated Apr. 29, 2024 for Korean Patent Application No. 10-2022-0126326 and its English translation provided by Applicant's foreign counsel.

* cited by examiner

*Primary Examiner* — Melanie Torres Williams
(74) *Attorney, Agent, or Firm* — WOMBLE BOND DICKINSON (US) LLP

(57) ABSTRACT

An actuator and a brake system including the same are provided. The actuator includes a motor configured to generate power by receiving electric power from a power supply and a gear assembly configured to transmit the power provided from the motor to an output shaft, and the gear assembly includes a plurality of gears engaged with each other and a pocket covering around at least one of the gears to accommodate grease applied to the gear and a swellable material capable of swelling in contact with the grease.

20 Claims, 9 Drawing Sheets

ACTUATOR AND BRAKE SYSTEM INCLUDING THE SAME

CROSS-REFERENCE TO RELATED APPLICATION

This application claims the benefit of Korean Patent Application No. 2022-0126326, filed on Oct. 4, 2022 in the Korean Intellectual Property Office, the disclosure of which is incorporated herein by reference in its entirety.

BACKGROUND

1. Technical Field

Embodiments of the present disclosure generally relate to an actuator and a brake system including the same, and more particularly, to an actuator having improved performance and durability and a brake system including the same.

2. Description of the Related Art

In vehicles, a brake system for braking is necessarily installed, and various types of brake systems have been suggested for the safety of drivers and passengers.

An electromechanical brake system that provides a braking force to a vehicle by receiving a driver's willingness to brake as an electric signal and operating an actuator based on the received electric signal has been developed. Such an electromechanical brake system performs a service brake function and/or a parking brake function of the vehicle by converting a rotational force of a motor into linear motion of a piston.

SUMMARY

Therefore, it is an aspect of the present disclosure to provide an actuator capable of preventing scattering of lubricant applied between gears, and a brake system including the same.

It is another aspect of the present disclosure to provide an actuator capable of improving braking stability of a vehicle by increasing and maintaining a fastening force between gears, and a brake system including the same.

It is still another aspect of the present disclosure to provide an actuator capable of improving durability of component elements, and a brake system including the same.

It is yet aspect of the present disclosure to provide an actuator capable of reducing operating noise and vibration, and a brake system including the same.

It is yet still another aspect of the present disclosure to provide an actuator capable of improving the performance and lifespan of a product with a simple structure, and a brake system including the same.

Additional aspects of the disclosure will be set forth in part in the description which follows and, in part, will be obvious from the description, or may be learned by practice of the disclosure.

In accordance with one aspect of the present disclosure, an actuator includes a motor configured to generate power by receiving electric power from a power supply and a gear assembly configured to transmit the power provided from the motor to an output shaft, and the gear assembly includes a plurality of gears engaged with each other and a pocket provided around at least one of the gears to accommodate grease applied to the gear therein and swell in contact with the grease.

The gear assembly may further include a driving gear provided on a drive shaft of the motor and a driven gear engaged with the driving gear, and the pocket may include a body disposed along a circumference of the driving gear and an opening formed by opening one side of the body to allow the driven gear to pass therethrough.

The body may be formed to extend along an axial direction of the driving gear.

The actuator may further include a housing having an installation space so that the gear assembly is accommodated therein, and the pocket may be supported by the housing.

The housing may include a plurality of ribs that supplement rigidity, and an outer surface of the body may be in surface contact with and supported by the ribs.

The pocket may further include a tray formed to protrude toward the driving gear at an inner end of the body.

The actuator may further include a cover coupled to the housing and configured to seal the installation space, and an outer end of the body may face an inner surface of the cover.

The gear assembly may further include a worm shaft provided with the driven gear on one side thereof and a worm gear on the other side and disposed orthogonally to the drive shaft and a worm wheel engaged with the worm gear.

The gear assembly may further include a first sub-pocket provided around the driven gear to accommodate grease applied to the driven gear and swell in contact with the grease and a second sub-pocket provided around the worm gear to accommodate grease applied to the worm gear and swell in contact with the grease.

The pocket may be made of a rubber material that absorbs some of the grease and increases in volume.

In accordance with another aspect of the present disclosure, an actuator includes a motor configured to generate power by receiving electric power from a power supply, a gear assembly including a plurality of gears to transmit the power provided from the motor to an output shaft, and a housing having an installation space so that the gear assembly is accommodated therein, the gear assembly includes a pocket provided around at least one of the gears to accommodate grease applied to the gear therein, and the pocket has an outer surface that is in contact with and supported by the housing and swells inward toward the gear upon contacting the grease.

The gear assembly may further include a first helical gear provided on a drive shaft of the motor and a second helical gear engaged with the first helical gear, and the pocket may be provided around the first helical gear and include an opening formed by opening one side to allow the second helical gear to enter the inside.

The pocket may further include a body disposed along a circumference of the first helical gear and formed to extend along an axial direction of the first helical gear, and an outer surface of the body may be in contact with and supported by the housing.

The housing may include a plurality of ribs that supplement rigidity, and the outer surface of the body may be in surface contact with and supported by the ribs.

The pocket may further include a tray formed to protrude toward the first helical gear at an inner end of the body.

The actuator may further include a cover coupled to the housing and configured to seal the installation space, and an outer end of the body may face an inner surface of the cover.

The gear assembly may further include a worm shaft provided with the second helical gear on one side thereof and a worm gear on the other side and disposed orthogonally to the drive shaft and a worm wheel engaged with the worm gear.

The gear assembly may further include a first sub-pocket provided around the second helical gear to accommodate grease applied to the second helical gear and swell in contact with the grease and a second sub-pocket provided around the worm gear to accommodate grease applied to the worm gear and swell in contact with the grease.

The pocket may be made of a rubber material that absorbs the grease and increases in volume.

In accordance with still another aspect of the present disclosure, there is provided a brake system including the actuator in accordance with any one of the aspects.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EMBODIMENTS

Figure 1:
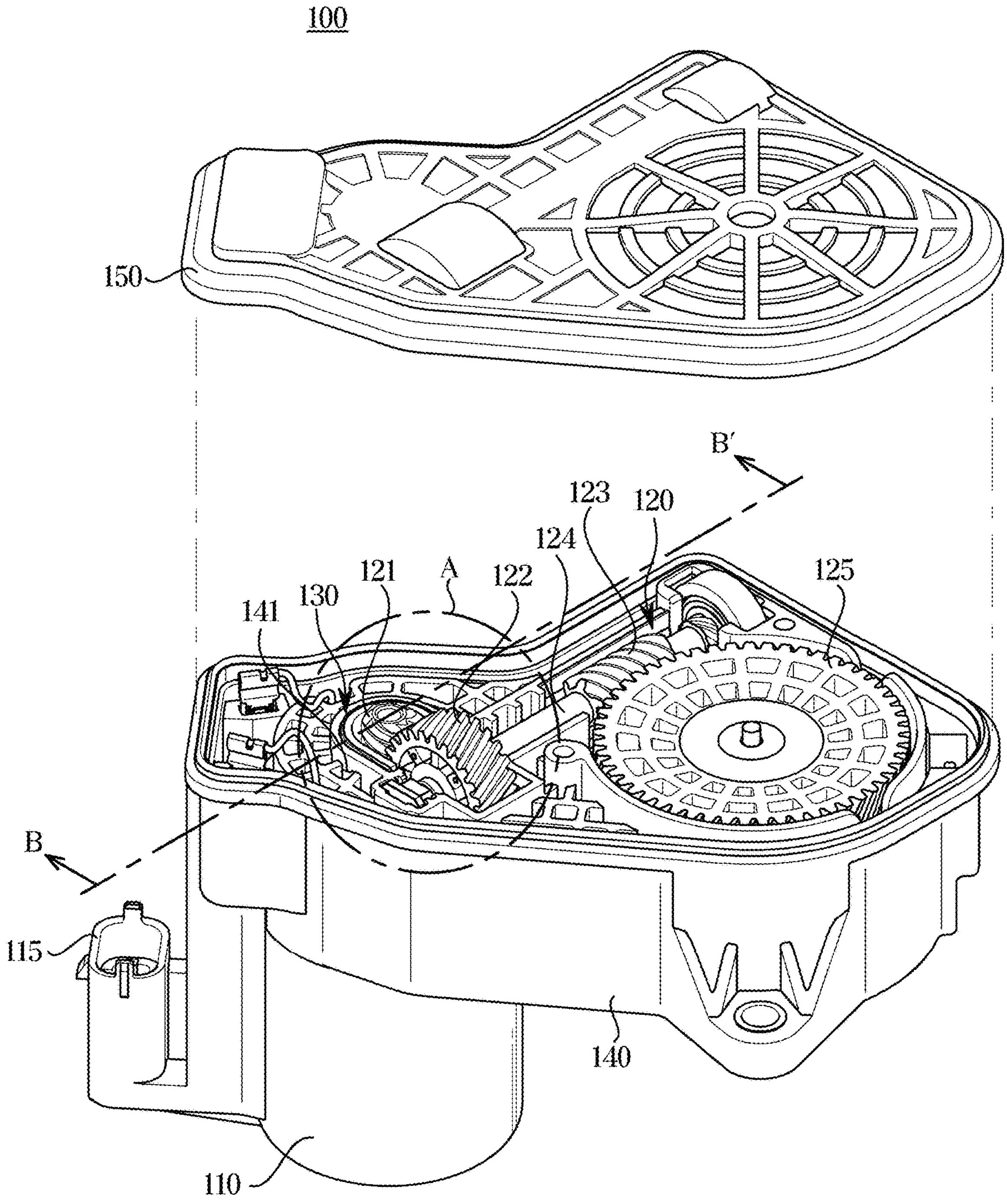
FIG. 1 is an exploded perspective view illustrating an actuator in accordance with an embodiment of the present disclosure.

FIG. 1 is an exploded perspective view illustrating an actuator 100 in accordance with an embodiment of the present disclosure.

Referring to FIG. 1, the actuator 100 in accordance with an embodiment of the present disclosure may include a motor 110 configured to provide force or power by receiving electric power from a power supply (e.g. a battery), a gear assembly 120 configured to transmit the force or power provided from the motor 110 to an output shaft of the actuator 100, a housing 140 having an installation space 141 so that the motor 110 and the gear assembly 120 are accommodated therein, and a cover 150 coupled to the housing 140 and sealing the installation space 141, and the actuator 100 in accordance with the embodiment may be included in a brake system or assembly configured to brake a vehicle and may provide a force or torque for brake to the vehicle.

The motor 110 is configured to generate and provide force or power for braking of the vehicle by receiving electric power from the power supply such as a battery of the vehicle. Operation of the motor 110 may be controlled by receiving an operation signal or command from an electronic control unit such as an electronic circuit, microprocessor, and chips. The motor 110 may be accommodated and mounted together with other components of the actuator 100 in the housing 140 to be described below, or accommodated and mounted in a separate motor housing, and then coupled to the housing 140 to form the actuator 100 or mounted to the outside of the housing 140. The motor 110 may be provided with at least one connector 115 electrically connected to the power supply such as the battery of the vehicle, various sensors including the electronic control unit, and other electric components.

The motor 110 may generate rotational power by receiving electric power. The motor 110 may provide force or power for advancing and retreating a pressing member such as a piston toward and from a disk mounted on a wheel of a vehicle, and may be configured as a bi-directional motor so that the motor 110 can perform both the braking of the vehicle by the advancing of the pressing member and the release of braking of the vehicle by the retreating of the pressing member. The rotational force or power generated and provided by the motor 110 may be reduced through the gear assembly 120 to be described below and then transmitted to the output shaft of the actuator 100, and the output shaft may be operably connected to a power converter configured to convert the rotational force into linear motion, causing the pressing member to advance and retreat.

The housing 140 may form an outer appearance of the actuator 100 and have the installation space 141 in which the gear assembly 120 is accommodated and supported. A plurality of ribs 145 may be provided in the installation space 141 of the housing 140, and the ribs 145 may be formed in a plate shape or a grid shape to supplement the rigidity of the housing 140. However, in a portion of the housing 140 where the gear assembly 120 is accommodated, a hollow may be formed to prevent interference between the ribs 145 and a gear of the gear assembly 120. As the cover 150 is mounted on one surface or side of the housing 140, the installation space 141 of the housing 140 may be sealed by the cover 150, and a sealing member may be interposed between the housing 140 and the cover 150 to prevent moisture or foreign substances from entering the installation space 141 of the housing. The housing 140 may be provided integrally with a housing for the motor 110, or may be separately manufactured and then assembled and coupled to the housing for the motor 110 using fastening members such as bolts and clips or bonding means for example adhesive.

The gear assembly 120 is provided to transmit the rotational force or power generated and provided by the motor 110 to the output shaft of the actuator 100. The gear assembly 120 may include a plurality of gears to reduce and transmit the rotational force or power of the motor 110. For example, as illustrated in FIG. 1, the gear assembly 120 may include a first helical gear 121 fixed to or provided on a drive shaft 111 of the motor 110, a second helical gear 122 engaged with the first helical gear 121, a worm shaft 124 having one side or portion to or on which the second helical gear 122 is fixed or provided to form a rotating shaft thereof and disposed orthogonally to the drive shaft 111, a worm gear 123 fixed to or provided on the other side or portion of the worm shaft 124, a worm wheel 125 engaged with the worm gear 123, at least one reduction gear that additionally reduces power transmitted from the worm wheel 125, and a pocket 130 that swells in contact with lubricant G (e.g. grease) or stores the grease G therein.

The first helical gear 121 may be fixed to the drive shaft 111 of the motor 110 and rotate together with the drive shaft 111 according to the operation of the motor 110. The worm shaft 124 may be disposed orthogonally to the drive shaft 111 of the motor 110, and the second helical gear 122 may be vertically engaged with the first helical gear 121 while being provided on one side or one end portion of the worm shaft 124. By the rotation of the first helical gear 121, the second helical gear 122 and the worm shaft 124 are decelerated and rotated, and accordingly, the worm gear 123 provided on the other side or the other end portion of the worm shaft 124 also rotates together. Since the worm gear 123 is engaged with the worm wheel 125, the rotation of the worm gear 123 causes the worm wheel 125 to rotate, so that the rotational power may be reduced and transmitted to the output shaft of the actuator 100.

Meanwhile, as a fastening force between gears of the gear assembly 120 normally acts as a load for maintaining a parking braking state of the vehicle, lubricants such as grease are applied to the gears to increase the fastening force between the gears and improve the efficiency of power transmission through the gears. In particular, it is required to apply the grease G to the first helical gear 121 acting as a driving gear to transmit force or power, and when the drive shaft 111 and the first helical gear 121 are operated, heat is generated and a centrifugal force acts due to rotation, so that the grease G may be scattered from the first helical gear 121. When the grease G is scattered or separated or moved away from the first helical gear 121, the fastening force and the power transmission efficiency between the first helical gear 121 and the second helical gear 122 may be reduced, so that the parking braking of the vehicle may be released, and the operation noise and vibration of the actuator 100 may become increased or severe.

Accordingly, the actuator 100 in accordance with an embodiment of the present disclosure may include the pocket 130 that accommodates the grease G applied to the inside of the pocket 130 and swells in contact with the grease G or stores the grease G therein.

Figure 2:
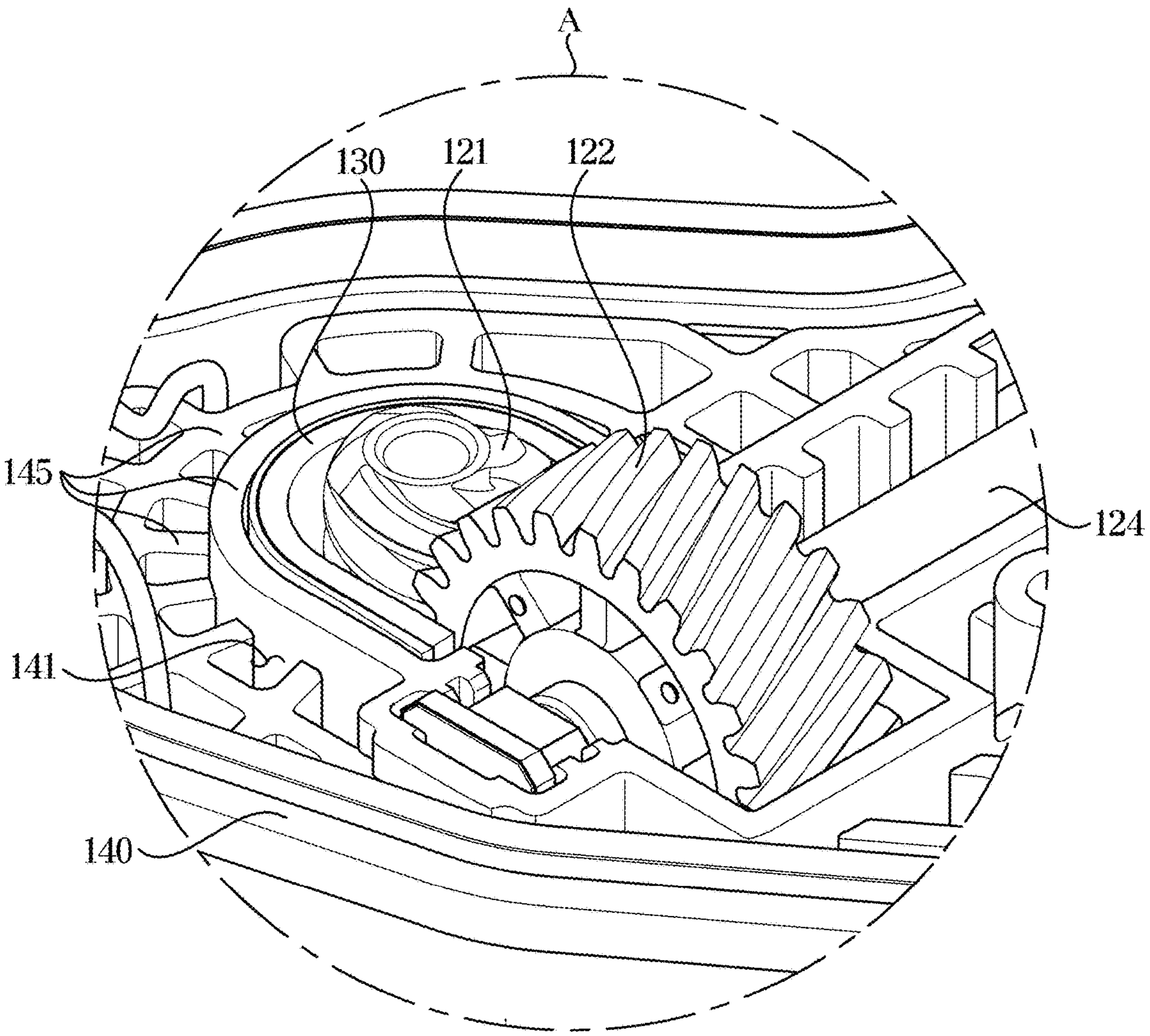
FIG. 2 is an enlarged view of part A of FIG. 1.
Figure 3:
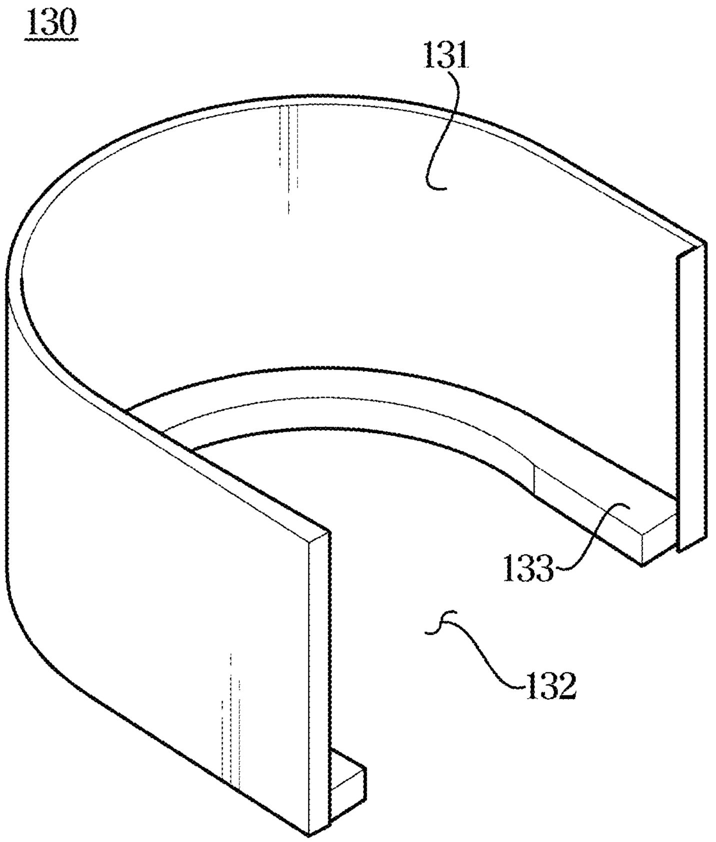
FIG. 3 is a perspective view illustrating a pocket in accordance with an embodiment of the present disclosure.
Figure 4:
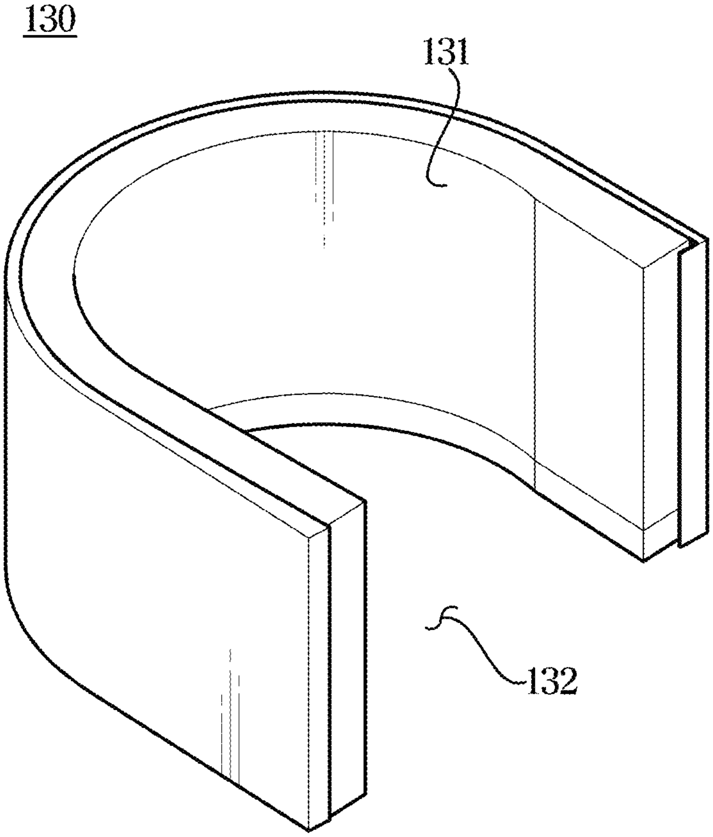
FIG. 4 is a perspective view illustrating a pocket swollen by grease in accordance with an embodiment of the present disclosure.
Figure 5:
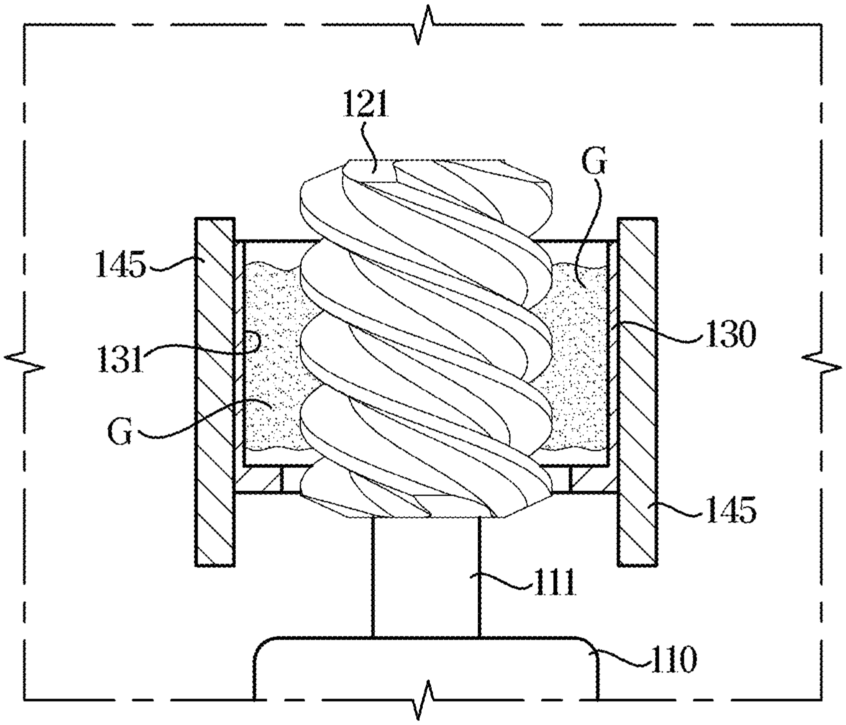
FIG. 5 is a cross-sectional view taken along a B-B' line of FIG. 1 for illustrating a state before a pocket is swollen by grease.
Figure 6:
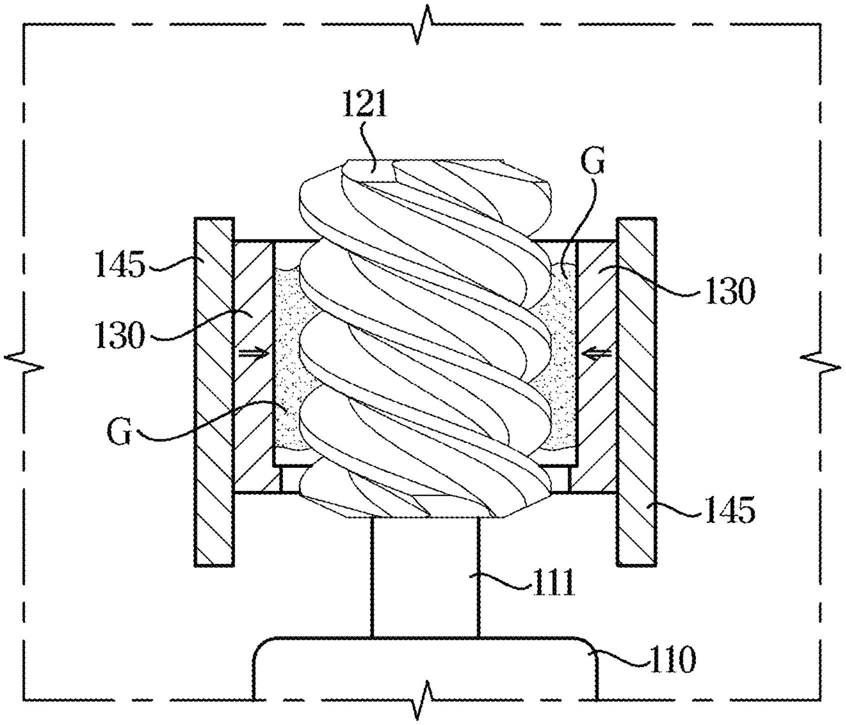
FIG. 6 is a cross-sectional view taken along a B-B' line of FIG. 1 for illustrating a state in which a pocket is swollen by grease.

FIG. 2 is an enlarged view of part A of FIG. 1. In addition, FIG. 3 is a perspective view illustrating the pocket 130 in accordance with an embodiment of the present disclosure and FIG. 4 is a perspective view illustrating the pocket 130 swollen by the grease G in accordance with an embodiment of the present disclosure. FIGS. 5 and 6 are cross-sectional views taken along a B-B' line of FIG. 1 for illustrating the pocket 130 before and after being swollen, respectively.

Referring to FIGS. 1 to 6, the pocket 130 may be provided around the first helical gear 121 acting as a driving gear for transmitting rotational force or power. The pocket 130 may accommodate the grease G therein to be applied to the first helical gear 121, and may be supported and mounted in the installation space 141 of the housing 140. The pocket 130 may be made of a swellable material such as a rubber material that is capable of increasing or expanding in volume by absorbing some of the grease G containing an oil component.

The pocket 130 may include a body 131 covering the first helical gear 121 along a circumference of the first helical gear 121 or disposed adjacent to a circumference of the first helical gear 121, an opening 132 formed by opening one side of the body 131, and a tray 133 formed to inwardly protrude from an inner end of the body 131 (e.g. a lower end of the body 131 in FIGS. 5 and 6).

The body 131 of the pocket 130 may have an inner surface shape substantially corresponding to an outer surface shape of the first helical gear 121 to stably accommodate and hold the grease G applied to the first helical gear 121. To this end, the body 131 may be disposed along the circumference of the first helical gear 121 and formed to extend along an axial direction of the first helical gear 121.

An outer surface of the body 131 of the pocket 130 may be in contact with and supported by the housing 140. Specifically, the outer surface of the body 131 may be in surface contact with and supported by the ribs 145 provided in the installation space 141 of the housing 140. As the outer surface of the body 131 is in direct or surface contact with the ribs 145, an inner surface of the body 131 may approach the first helical gear 121 when the pocket 130 is swollen by the grease G, thereby preventing the grease G from scattering or separating from or moving away from the first helical gear 121 and maintaining a state in which the grease G adheres to the first helical gear 121.

The opening 132 may be formed such that one side of the body 131 is opened or may be formed such that the second helical gear 122 acting as a driven gear is allowed to pass through the opening 132. The second helical gear 122 may engage with the first helical gear 121 through the opening 132 of the pocket 130, and even when the pocket 130 swells, the pocket 130 may not interfere with the rotation or operation of the first helical gear 121 and the second helical gear 122.

The tray 133 may be provided at the inner end of the body 131 to prevent the grease G from flowing down due to gravity or its own weight. Specifically, the tray 133 may be formed to inwardly protrude toward the first helical gear 121 from the body 131 and formed to extend along the inner end of the body 131 so that the grease G may be prevented from flowing down toward the motor 110 before swelling of the body 131. In addition, even when the actuator 100 does not operate for a long time, the tray 133 can prevent the grease G from flowing down to the motor 110, so that separation of the grease G from the first helical gear 121 may be suppressed.

An outer end of the body 131 (e.g. an upper end of the body 131 in FIGS. 5 and 6) may face or contact an inner surface of the cover 150. As the outer end of the body 131 faces or contacts the inner surface of the cover 150, the grease G accommodated inside the pocket 130 may be prevented from separating and scattering to the outside of the housing 140 or flowing or leaking out of the housing 140. In other words, the grease G accommodated inside the pocket 130 may be prevented from separating and scattering in a radial direction relative to the first helical gear 121 or flowing out of the pocket 130 in a radial direction by the body 131 and may be prevented from scattering or flowing out of the pocket 130 in an axial direction by the tray 133 and the cover 150.

Describing the process of assembling the actuator 100 for swelling the pocket 130 in accordance with an embodiment of the present disclosure, the grease G is applied to the first helical gear 121 when the actuator 100 is assembled, and the grease G is accommodated inside the pocket 130 (see FIG. 5). Then, the pocket 130 having a swellable material such as rubber swells by increasing or expanding in volume while gradually absorbing some of the grease G, and since the outer surface of the body 131 is in a state of being in contact with the ribs 145 of the housing 140, the inner surface of the body 131 approaches the first helical gear 121 (see FIG. 6). In this way, a gap between the outer surface of the first helical gear 121 and the inner surface of the body 131 can be reduced or narrowed, so that the state in which the grease G adheres to the first helical gear 121 is maintained even when the first helical gear 121 rotates by the operation of the actuator 100, and thus the fastening force between the gears may be maintained and the reduction in efficiency of power transmission may be suppressed. Furthermore, even before the body 131 of the pocket 130 swells or even if the actuator 100 does not operate, the grease G may be prevented from flowing down toward the motor 110 by the tray 133 and the grease G may be prevented from leaking out of the pocket 130 by the cover 150.

Figure 7:
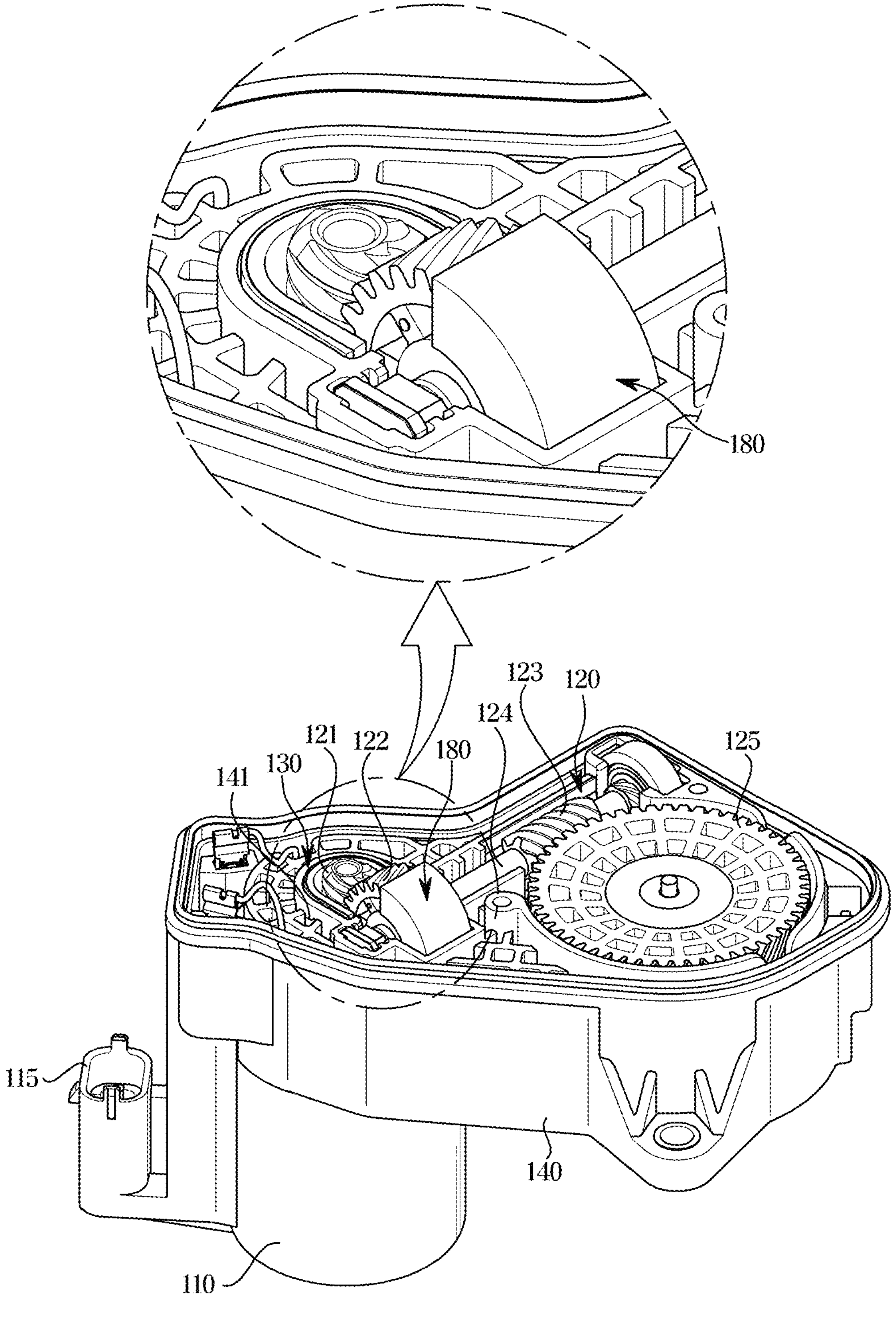
FIG. 7 is an exploded perspective view illustrating an actuator in accordance with another embodiment of the present disclosure.
Figure 8:
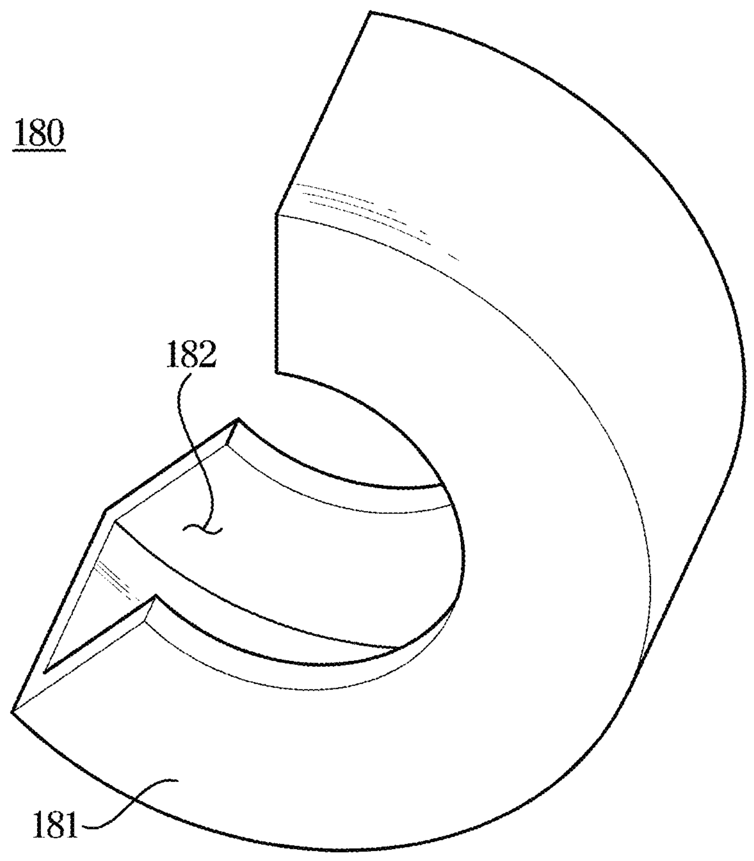
FIG. 8 is a perspective view illustrating a first sub-pocket in accordance with an embodiment of the present disclosure.

FIG. 7 is an exploded perspective view illustrating the actuator 100 in accordance with another embodiment of the present disclosure, and FIG. 8 is a perspective view illustrating a first sub-pocket 180 in accordance with another embodiment of the present disclosure.

Referring to FIGS. 7 and 8, the actuator 100 in accordance with another embodiment present disclosure may include the motor 110 configured to generate or provide force or power by receiving electric power from a power supply (e.g. a battery), the gear assembly 120 configured to transmit the force or power provided from the motor 110 to the output shaft of the actuator 100, the housing 140 having the installation space 141 so that the motor 110 and the gear assembly 120 are accommodated therein, and the cover 150 coupled to the housing 140 and sealing the installation space 141, and the gear assembly 120 may include the pocket 130 accommodating lubricant G (e.g. grease) applied to one of gears of the gear assembly 120 or storing the grease G therein and the pocket 130 may swell when in contact with the grease G and the first sub-pocket 180.

Referring to FIGS. 7 and 8, the first sub-pocket 180 may be provided around the second helical gear 122 acting as a driven gear receiving the rotational force or power. The first sub-pocket 180 may accommodate the grease G applied to the second helical gear 122 or store the grease G therein, and may be supported and mounted in the installation space 141 of the housing 140. The first sub-pocket 180 may be made of a swellable material such as a rubber material that is capable of increasing or expanding in volume by absorbing some of the grease G containing an oil component.

The first sub-pocket 180 may include a body 181 covering the second helical gear 122 along a circumference of the second helical gear 122 or disposed adjacent to a circumference of the second helical gear 122 and an opening 182 formed by opening one side or an end portion of the body 181. The body 181 may have an inner surface shape substantially corresponding to an outer surface shape of the second helical gear 122 to stably accommodate and hold the grease G applied to the second helical gear 122. To this end, the body 181 may cover the second helical gear 122 along the circumference of the second helical gear 122 or be disposed adjacent to the circumference of the second helical gear 122 and formed to cover or surround at least a portion of the outer circumferential surface and both side surfaces of the second helical gear 122.

An outer surface of the body 181 may be in contact with and supported by the housing 140. Specifically, the outer surface of the body 181 may be in direct or surface contact with and supported by the ribs 145 provided in the installation space 141 of the housing 140. As the outer surface of the body 181 is in surface contact with the ribs 145, an inner surface of the body 181 may approach the second helical gear 122 when the first sub-pocket 180 is swollen by the grease G, thereby preventing the grease G from scattering or moving away or separating from the second helical gear 122 and maintaining a state in which the grease G adheres to the second helical gear 122. Further, an outer end of the body 181 (e.g. an upper end of the body 181 in FIGS. 7 and 8) may face or contact the inner surface of the cover 150.

The opening 182 may be formed by opening one side or one end portion of the body 181 or formed at one side of the body 181 to allow the first helical gear 121, which is a driving gear that transmits force or power to the second helical gear 122, to pass therethrough. The first helical gear 121 may approach and engage with the second helical gear 122 through the opening 182 of the first sub-pocket 180, and even when the first sub-pocket 180 swells, the first sub-pocket 180 may not interfere with the rotation or operation of the first helical gear 121.

Describing the process of assembling the actuator 100 for swelling the first sub-pocket 180 in accordance with an embodiment of the present disclosure, the grease G is applied to the second helical gear 122 when the actuator 100 is assembled, and the grease G is accommodated inside the first sub-pocket 180. Then, the first sub-pocket 180 having a swellable material such as rubber swells by increasing or expanding in volume while gradually absorbing some of the grease G, and since the outer surface of the body 181 is in a state of being in contact with the ribs 145 or the cover 150 of the housing 140, the inner surface of the body 181 approaches the second helical gear 122. In this way, a gap between the outer surface of the second helical gear 122 and the inner surface of the body 181 can be reduced or narrowed, so that the state in which the grease G adheres to the second helical gear 122 is maintained even when the second helical gear 122 rotates by the operation of the actuator 100, and thus the fastening force between the gears of the gear assembly 120 may be maintained and the reduction in efficiency of power transmission may be suppressed.

Figure 9:
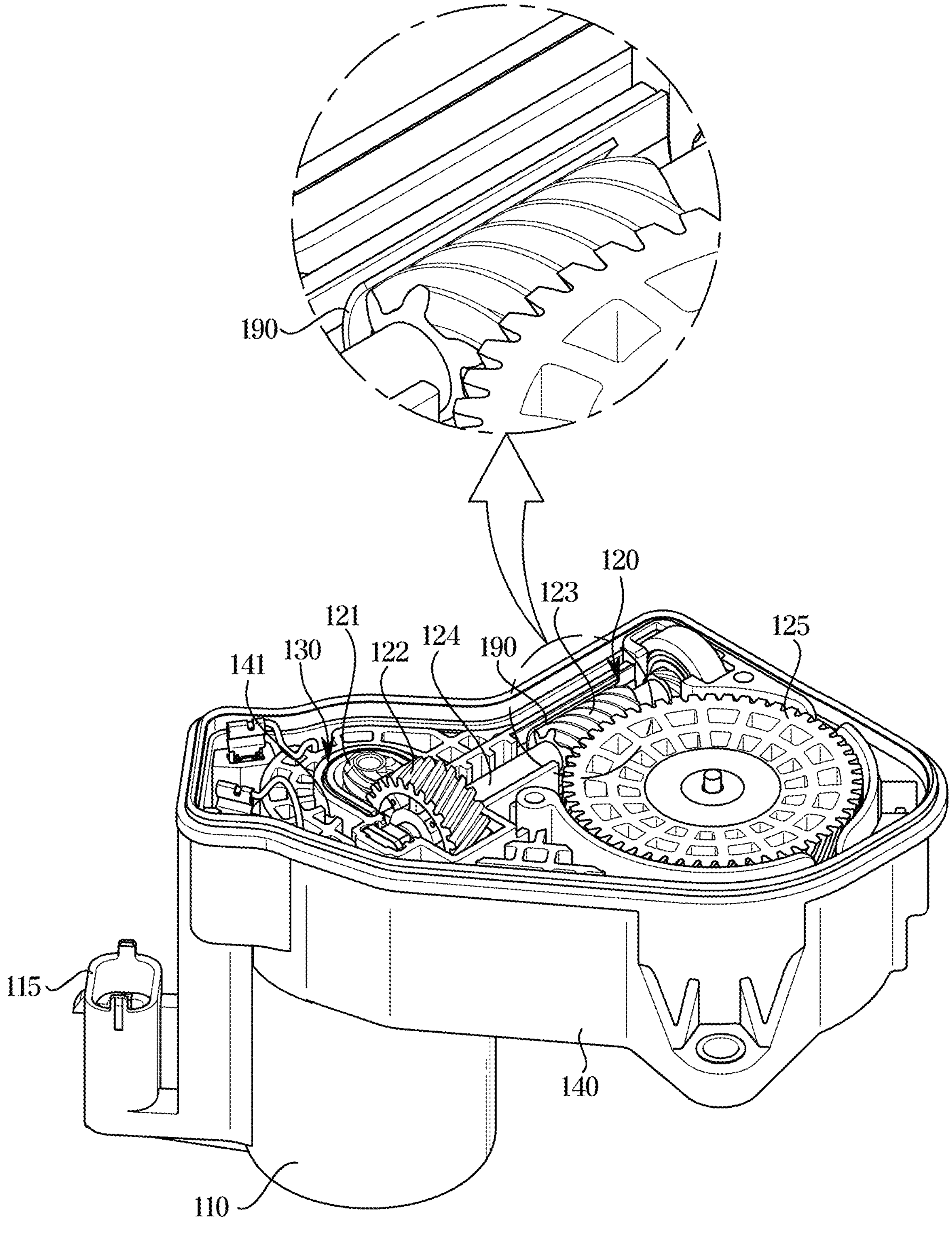
FIG. 9 is an exploded perspective view illustrating an actuator in accordance with still another embodiment of the present disclosure.

FIG. 9 is an exploded perspective view illustrating the actuator 100 in accordance with still another embodiment of the present disclosure.

Referring to FIG. 9, the actuator 100 in accordance with still another embodiment of the present disclosure may include the motor 110 configured to generate or provide force or power by receiving electric power from a power supply (e.g. a battery), the gear assembly 120 configured to transmit the force or power provided from the motor 110 to the output shaft of the actuator 100, the housing 140 having the installation space 141 so that the motor 110 and the gear assembly 120 are accommodated therein, and the cover 150 coupled to the housing 140 and sealing the installation space 141, and the gear assembly 120 may include the pocket 130 accommodating lubricant G (e.g. grease) applied to one of gears of the gear assembly 120 or storing the grease G therein and the pocket 130 may swell when in contact with the grease G and a second sub-pocket 190.

Referring to FIG. 9, the second sub-pocket 190 may be provided around the worm gear 123 acting as a driving gear for transmitting rotational force or power to the worm wheel 125. The second sub-pocket 190 may accommodate the grease G applied to the worm gear 123 or store the grease G therein, and may be supported and mounted in the installation space 141 of the housing 140. The second sub-pocket 190 may be made of a swellable material such as a rubber material that is capable of increasing or expanding in volume by absorbing some of the grease G containing an oil component.

The second sub-pocket 190 may cover the worm gear 123 along a circumference of the worm gear 123 or be disposed adjacent to a circumference of the worm gear 123, and may be formed by opening one side or an end portion to allow the worm wheel 125 to pass therethrough. The second sub-pocket 190 may have an inner surface shape substantially corresponding to an outer surface shape of the worm gear 123 to stably accommodate and hold the grease G applied to the worm gear 123, and to this end, the second sub-pocket 190 may cover the worm gear 123 along the circumference of the worm gear 123 or be disposed adjacent to the circumference of the worm gear 123 and formed to extend along an axial direction of the worm shaft 124.

An outer surface of the second sub-pocket 190 may be in contact with and supported by the housing 140. Specifically, the outer surface of the second sub-pocket 190 may be in surface contact with and supported by the ribs 145 provided in the installation space 141 of the housing 140. As the outer surface of the second sub-pocket 190 is in direct or surface contact with the ribs 145, an inner surface of the second sub-pocket 190 may approach the worm gear 123 when the second sub-pocket 190 is swollen by the grease G, thereby preventing the grease G from scattering or moving away or separating from the worm gear 123 and maintaining a state in which the grease G adheres to the worm gear 123.

One side of the second sub-pocket 190 may be formed to be open to allow the worm wheel 125 acting as a driven gear to pass through the open side of the second sub-pocket 190. In this way, even when the second sub-pocket 190 swells, the second sub-pocket 190 may not interfere with the rotation or operation of the worm gear 123 and the worm wheel 125.

Describing the process of assembling the actuator 100 for swelling the second sub-pocket 190 according to an embodiment of the present disclosure, the grease G is applied to the worm gear 123 when the actuator 100 is assembled, and the grease G is accommodated inside the second sub-pocket 190. Then, the second sub-pocket 190 having a swellable material such as rubber swells by increasing or expanding in volume while gradually absorbing some of the grease G, and since the outer surface of the second sub-pocket 190 is in a state of being in contact with the ribs 145 of the housing 140, the inner surface of the second sub-pocket 190 approaches the worm gear 123. In this way, a gap between the outer surface of the worm gear 123 and the inner surface of the second sub-pocket 190 can be reduced or narrowed, so that the state in which the grease G adheres to the worm gear 123 is maintained even when the worm shaft 124 rotates by the operation of the actuator 100, and thus the fastening force between the gears of the gear assembly 120 may be maintained and the reduction in efficiency of power transmission may be suppressed.

As is apparent from the above description, an actuator and a brake system including the same in accordance with some embodiments of the present disclosure can prevent a lubricant (e.g. grease) applied between gears from scattering by using a pocket having swellable material capable of absorbing the lubricant.

An actuator and a brake system including the same in accordance with certain embodiments of the present disclosure can improve braking stability of a vehicle by increasing and maintaining a fastening force between gears by having a pocket that accommodates lubricant (e.g. grease) applied to the inside of the pocket and a gear and swells in contact with the grease.

An actuator and a brake system including the same in accordance with certain embodiments of the present disclosure can improve durability of component elements by keeping a lubricant (e.g. grease) between gears by using a pocket having swellable material capable of absorbing the lubricant.

An actuator and a brake system including the same in accordance with some embodiments of the present disclosure can reduce operating noise and vibration by preventing a lubricant (e.g. grease) applied between gears from moving away from the gears using a pocket having swellable material capable of absorbing the lubricant.

An actuator and a brake system including the same in accordance with certain embodiments of the present disclosure can improve the performance and lifespan of a product with a simple structure by having a pocket having swellable material capable of absorbing a lubricant and accommodating the lubricant and at least one of gears.

What is claimed is:

1. An actuator comprising:
- a motor configured to generate power; and
- a gear assembly configured to transmit the power provided from the motor,
- wherein the gear assembly includes:
  - a plurality of gears; and
  - a pocket covering around a first one of the gears to accommodate grease applied to the first one of the gears in the pocket, the pocket comprising a swellable material capable of swelling in contact with the grease, the pocket including an opening formed at one side of the pocket to allow a second one of the gears to pass through the opening to be rotatably engaged with the first one of the gears.

2. The actuator according to claim 1, wherein:
- the plurality of gears comprise:
  - a driving gear mounted to a drive shaft of the motor; and
  - a driven gear rotatably engaged with the driving gear, and
- the pocket includes:
  - a body covering along a circumference of the driving gear; and
  - an opening formed at one side of the body of the pocket to allow the driven gear to pass through the opening to be rotatably engaged with the driving gear.

3. The actuator according to claim 2, wherein the body of the pocket extends along an axial direction of the driving gear.

4. The actuator according to claim 2, further comprising a housing having an inner space so that the gear assembly is disposed in the inner space of the housing,
- wherein the pocket is supported by the housing.

5. The actuator according to claim 4, wherein:
- the housing includes a plurality of ribs, and
- an outer surface of the body of the pocket is in contact with and supported by the ribs of the housing.

6. The actuator according to claim 4, wherein the pocket further includes a tray protruding toward an axis of the driving gear from the body of the pocket.

7. The actuator according to claim 6, further comprising a cover coupled to the housing to seal the inner space of the housing,
- wherein an outer end of the body of the pocket faces an inner surface of the cover.

8. The actuator according to claim 2, wherein:
- the gear assembly further includes a worm shaft disposed orthogonally to the drive shaft, wherein the driven gear is mounted to one portion of the worm shaft and a worm gear is mounted to another portion of the worm shaft, and
- the plurality of gears comprise a worm wheel rotatably engaged with the worm gear.

9. The actuator according to claim 8, wherein the gear assembly further includes:

a first sub-pocket covering around the driven gear to accommodate grease applied to the driven gear, the first sub-pocket comprising the swellable material capable of swelling in contact with the grease; and a second sub-pocket covering around the worm gear to accommodate grease applied to the worm gear, the second sub-pocket comprising the swellable material capable of swelling in contact with the grease.

10. The actuator according to claim 1, wherein the swellable material comprised in the pocket includes a rubber material capable of absorbing some of the grease and increasing in volume.

11. An actuator comprising:

a motor configured to generate power;

a gear assembly including a plurality of gears to transmit the power provided from the motor; and a housing having an inner space so that the gear assembly is disposed in the inner space of the housing, wherein:

the gear assembly includes a pocket covering around a first one of the gears to accommodate grease applied to the first one of the gears in the pocket, and the pocket has an outer surface, which is in contact with and supported by the housing, a swellable material capable of swelling inward toward the first one of the gears by absorbing the grease, and an opening formed at one side of the pocket to allow a second one of the gears to pass through the opening to be rotatably engaged with the first one of the gears.

12. The actuator according to claim 11, wherein:

the plurality of gears include a first helical gear mounted to a drive shaft of the motor and a second helical gear engaged with the first helical gear, and the pocket covers around the first helical gear and includes an opening formed at one side of the pocket to allow the second helical gear to pass through the opening to be rotatably engaged with the first helical gear.

13. The actuator according to claim 12, wherein:

the pocket further includes a body covering along a circumference of the first helical gear and extending along an axial direction of the first helical gear, and an outer surface of the body of the pocket is in contact with and supported by the housing.

14. The actuator according to claim 13, wherein:

the housing includes a plurality of ribs, and the outer surface of the body of the pocket is in contact with and supported by the ribs of the housing.

15. The actuator according to claim 13, wherein the pocket further includes a tray protruding toward an axis of the first helical gear from the body of the pocket.

16. The actuator according to claim 15, further comprising a cover coupled to the housing to seal the inner space of the housing, wherein an outer end of the body of the pocket faces an inner surface of the cover.

17. The actuator according to claim 12, wherein:

the gear assembly further includes a worm shaft disposed orthogonally to the drive shaft, wherein the second helical gear is mounted to one portion of the worm shaft and a worm gear is mounted to another portion of the worm shaft, and the plurality of gears comprise a worm wheel rotatably engaged with the worm gear.

18. The actuator according to claim 17, wherein the gear assembly further includes:

a first sub-pocket covering around the second helical gear to accommodate grease applied to the second helical gear, the first sub-pocket comprising the swellable material capable of swelling in contact with the grease; and a second sub-pocket covering around the worm gear to accommodate grease applied to the worm gear, the second sub-pocket comprising the swellable material capable of swelling in contact with the grease.

19. The actuator according to claim 11, wherein the swellable material comprised in the pocket includes a rubber material capable of absorbing the grease and increasing in volume.

20. A brake system comprising the actuator according to claim 1.

* * * * *